(12) United States Patent
Persson et al.

(10) Patent No.: US 11,689,583 B2
(45) Date of Patent: Jun. 27, 2023

(54) NETWORK NODE, ENTITY AND METHODS PERFORMED THEREIN FOR HANDLING A COMMUNICATION SESSION IN A COMMUNICATION NETWORK

(71) Applicant: Telefonaktiebolaget LM Ericsson (publ), Stockholm (SE)

(72) Inventors: Staffan Persson, Kista (SE); Ramona Bunea, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/311,621

(22) PCT Filed: Dec. 10, 2018

(86) PCT No.: PCT/SE2018/051265
§ 371 (c)(1),
(2) Date: Jun. 7, 2021

(87) PCT Pub. No.: WO2020/122771
PCT Pub. Date: Jun. 18, 2020

(65) Prior Publication Data
US 2022/0021713 A1   Jan. 20, 2022

(51) Int. Cl.
*H04L 65/1069* (2022.01)
*H04L 67/147* (2022.01)
*H04L 65/1101* (2022.01)

(52) U.S. Cl.
CPC ...... *H04L 65/1069* (2013.01); *H04L 65/1101* (2022.05); *H04L 67/147* (2013.01)

(58) Field of Classification Search
None
See application file for complete search history.

(56) References Cited

U.S. PATENT DOCUMENTS

| 7,957,348 B1 * | 6/2011 | Gallagher | H04W 76/22 370/328 |
| 9,264,288 B1 * | 2/2016 | Arora | H04L 67/564 |

(Continued)

FOREIGN PATENT DOCUMENTS

EP   1331785 A1   7/2003

OTHER PUBLICATIONS

International Search Report and Written Opinion of the International Searching Authority for PCT International Application No. PCT/SE2018/051265 dated Aug. 6, 2019.

(Continued)

*Primary Examiner* — Dhairya A Patel
(74) *Attorney, Agent, or Firm* — Sage Patent Group

(57) ABSTRACT

A method performed by a network node for handling a communication session in a communication network using a session description protocol, SDP, for communication sessions is provided. The network node sends, on one or both established communication sessions, a request with an indication. The indication indicates a request of one or more mappings of a payload type number to a codec associated to the communication session. The network node receives a response including one or more response indications. A response indication indicates one or more mappings of a payload type number to a codec associated to the communication session. The network node further sends a request indication indicating a mapping of a payload type number to a codec suggested to use in an offer message generated by the at least one entity. The mapping is selected based on the one or more response indications in the received response.

7 Claims, 8 Drawing Sheets

(56) References Cited

U.S. PATENT DOCUMENTS

| | | | |
|---|---|---|---|
| 9,350,699 B2* | 5/2016 | Boire-Lavigne | H04L 61/2564 |
| 10,594,744 B2* | 3/2020 | Hori | H04L 65/403 |
| 2008/0232768 A1* | 9/2008 | Desineni | H04L 65/65 |
| | | | 386/331 |
| 2009/0097477 A1* | 4/2009 | Zhu | H04L 65/1043 |
| | | | 370/352 |
| 2011/0142049 A1* | 6/2011 | Harding-Jones | H04L 45/74 |
| | | | 370/392 |
| 2013/0212159 A1* | 8/2013 | Vandikas | H04L 67/564 |
| | | | 709/203 |
| 2013/0230057 A1* | 9/2013 | Hori | H04W 36/0083 |
| | | | 370/466 |
| 2013/0332140 A1* | 12/2013 | Garg | G06F 30/33 |
| | | | 703/21 |
| 2014/0342739 A1* | 11/2014 | Hori | H04L 65/65 |
| | | | 455/436 |
| 2017/0026878 A1 | 1/2017 | Hori | |
| 2017/0054764 A1* | 2/2017 | Sharma | H04L 65/1104 |
| 2021/0409475 A1* | 12/2021 | Oyman | H04L 69/24 |

OTHER PUBLICATIONS

Schulzrinne et al., "RTP Profile for Audio and Video Conferences with Minimal Control," Network Working Group, Request for Comments: 3551, Jul. 2003, 38 pages.

Handley et al., "SDP: Session Description Protocol," Network Working Group, Request for Comments: 4566, Jul. 2006, 49 pages.

Rosenberg et al., "An Offer/Answer Model with the Session Description Protocol (SDP)," Network Working Group, Request for Comments: 3264, Jun. 2002, 25 pages.

* cited by examiner

NETWORK NODE, ENTITY AND METHODS PERFORMED THEREIN FOR HANDLING A COMMUNICATION SESSION IN A COMMUNICATION NETWORK

CROSS REFERENCE TO RELATED APPLICATION

This application is a 35 U.S.C. § 371 national stage application of PCT International Application No. PCT/SE2018/051265 filed on Dec. 10, 2018, the disclosure and content of which is incorporated by reference herein in its entirety.

TECHNICAL FIELD

Embodiments herein relate to a network node, an entity and methods performed therein regarding communication. Furthermore, a computer program and a computer-readable storage medium are also provided herein to perform the methods herein. In particular, embodiments herein relate to handling a communication session in a communication network.

BACKGROUND

In a typical communication network such as wireless communication networks or wired communication networks, communication devices, also known as user equipments, mobile stations, stations (STA) wired and/or wireless devices, communicate via e.g. access networks such as radio access networks (RAN) with one or more core networks (CN). The communication devices may e.g. communicate over wireless communication networks such as LTE, WCDMA, 5G etc. or may communicate over a wired setup being e.g. a Web Real-Time Communication (WebRTC) client, a WebRTC over the top (OTT) on a desktop or a fixed Session initiation protocol (SIP) phone call. There are a number of protocols that may be used to set up communication over a communication network such as SIP or Hypertext Transfer Protocol (HTTP). During a communication session between two entities there is a series of transactions performed between these entities such as setup of the communication session, possibly modification of the communication session, and also a teardown of the communication session, Since there could be many communication session in progress between the two entities at any time, e.g. there could be many simultaneous calls in progress between two SIP entities or user agents, communication sessions may be identified by a tag parameter in a From header, a tag parameter in the To header and the Call-ID header. The communication session uses a session description protocol (SDP), see request for comments (RFC) 4566, which is a format for describing communications parameters. SDP does not deliver any media by itself but is used between endpoints, also referred to as entities, for negotiation of media type, format, and all associated parameters. The set of parameters may be called a session profile. An SDP session description may include the following: Session name and purpose, Time(s) the session is active, the media comprising the session, information needed to receive those media such as addresses, ports, formats, codecs etc. The SDP is used in e.g. session initiation such as SIP, wherein SIP messages are used to create sessions carry session descriptions that allow participants to agree on a set of compatible media types. These session descriptions are commonly formatted using SDP. Furthermore, the SDP may be used when streaming media e.g. real time protocol (RTP) such as real time streaming protocol (RTSP) wherein an RTSP client and server negotiate an appropriate set of parameters for media delivery, partially using SDP syntax to describe those parameters. Alternative means of conveying session descriptions further include electronic mail and the World Wide Web (WWW). For both email and WWW distribution, the media type "application/SDP" is used. This enables automatic launching of applications for participation in the session from the WWW client or mail reader in a standard manner. Furthermore, SDP may be used in multicast session announcement. One protocol used to implement such a distributed directory is Session Announcement Protocol (SAP), wherein SDP provides the recommended session description format for such session announcements.

In a communication session there may be a network node placed in-between two entities, referred to as a back to back user agent that can be used to connect two already established communication session, e.g. SIP dialogs, with each other by triggering an SDP exchange, wherein a request is sent on one of the communication sessions in order to receive an SDP-offer that is sent in a request on the other communication session. If the SDP-offer received in the response to the request uses e.g. RTP and contains payload type numbers conflicting, mapped to another codec, with the already in use payload type numbers on the other communication session the two communication sessions cannot be connected without alteration of the communication sessions. Since the available payload type number space that can be used for dynamic mapping is relatively small, ranging between numbers 96-127, the risk of both communication sessions using the same number for a different codec is considerable, and will continue to be an issue as over time more new codecs are added. In addition, an end to end call can pass through several intermediate network nodes, each one increasing the chance of codec collision i.e. use of the same payload type number for the communication session.

SUMMARY

An object of embodiments herein is to provide a mechanism to handle communication sessions such as join existing communication sessions and re-setup the communication session between new communication sessions in an efficient manner.

According to an aspect the object is achieved by providing a method performed by a network node for handling a communication session, e.g. triggering an SDP exchange, in a communication network using a SDP for communication sessions. The network node is configured to connect entities of two established communication sessions with each other. The network node sends, on one or both established communication sessions, a request with an indication, wherein the indication indicates a request of one or more mappings of a payload type number to a codec associated to the communication session. The network node further receives, over at least one established communication session, a response, wherein the response comprises one or more response indications, wherein a response indication indicates one or more mappings of a payload type number to a codec associated to the communication session. Furthermore, the network node sends, to at least one of the entities, a request indication indicating a mapping of a payload type number to a codec suggested to use in an offer message generated by the at least one entity, wherein the mapping is selected based on the one or more response indications in the received response.

According to an aspect the object is achieved by providing a method performed by an entity, such as an end entity or an intermediate node, of an established communication session for handling a communication session in a communication network using an SDP for communication sessions. The entity is part in the established session with a network node. The entity receives a request or a response with an indication, wherein the indication indicates a request of one or more mappings of a payload type number to a codec associated to the established session. The entity further adds a response indication to a response or the received response, wherein the response indication indicates supported one or more mappings of a payload type number to a codec of the established session. The entity further sends, towards the network node, the response with the response indication.

It is herein also provided a computer program product comprising instructions, which, when executed on at least one processor, causes the at least one processor to carry out the methods herein, as performed by the network node or the entity such as a UE or an intermediate network node, respectively. Furthermore, it is herein provided a computer-readable storage medium, having stored thereon a computer program product comprising instructions which, when executed on at least one processor, cause the at least one processor to carry out the methods herein, as performed by the network node or the entity, respectively.

According to yet another aspect embodiments herein provide a network node for handling a communication session in a communication network using a SDP for communication sessions. The network node is configured to connect entities of two established communication sessions with each other. The network node is configured to send, on one or both established communication sessions, a request with an indication, wherein the indication indicates a request of one or more mappings of a payload type number to a codec associated to the communication session. The network node is further configured to receive, over at least one established communication session, a response, wherein the response comprises one or more response indications, wherein a response indication indicates one or more mappings of a payload type number to a codec associated to the communication session. The network node is also configured to send, to at least one of the entities, a request indication indicating a mapping of a payload type number to a codec suggested to use in an offer message generated by the at least one entity, wherein the mapping is selected based on the one or more response indications in the received response.

According to still yet another aspect the object is achieved by providing an entity of an established communication session for handling a communication session in a communication network using a SDP for communication sessions. The entity is configured to be part in the established session with a network node. The entity s further configured to receive a request or a response with an indication, wherein the indication indicates a request of one or more mappings of a payload type number to a codec associated to the established session. The entity is also configured to add a response indication to a response or the received response, wherein the response indication indicates related one or more mappings of a payload type number to a codec of the established session. The entity is configured to send, towards the network node, the response with the response indication.

Before connecting entities of two established communication sessions with each other, i.e. triggering the SDP exchange between the two communication sessions to be connected, the network node, such as a B2BUA, gathers information about mappings of payload type numbers to codecs in use on one or both sides of the communication sessions. This is achieved by sending the request with the indication on one or both of the communication sessions. The entity, such as an end entity e.g. a UE, sends a response to the request, which response contains a local payload type number mapping to codec e.g. used of the communication session. Each entity, e.g. node, along the way back to the network node then adds, if necessary, new local mappings to the response. This way, when the response reaches the network node, the response comprises one or more mappings compatible with one or all the network nodes the response has passed. Knowing all mappings needed for the call in the whole communication network, the network node sends a mapping proposal as the request indication to the entities. Thus, by knowing the mappings associated with the communication sessions the embodiments herein enable the network node to connect e.g. calls that have colliding payload type number to codec mappings. Thus, the network node may avoid using a payload type number already mapped to another codec, also called a conflicting codec, in any of the communication sessions. This leads to handling of communication sessions, such as join existing communication sessions and re-setup the communication session between new communication sessions, in an efficient manner.

BRIEF DESCRIPTION OF THE DRAWINGS

Embodiments will now be described in more detail in relation to the enclosed drawings, in which.

DETAILED DESCRIPTION

Figure 1:
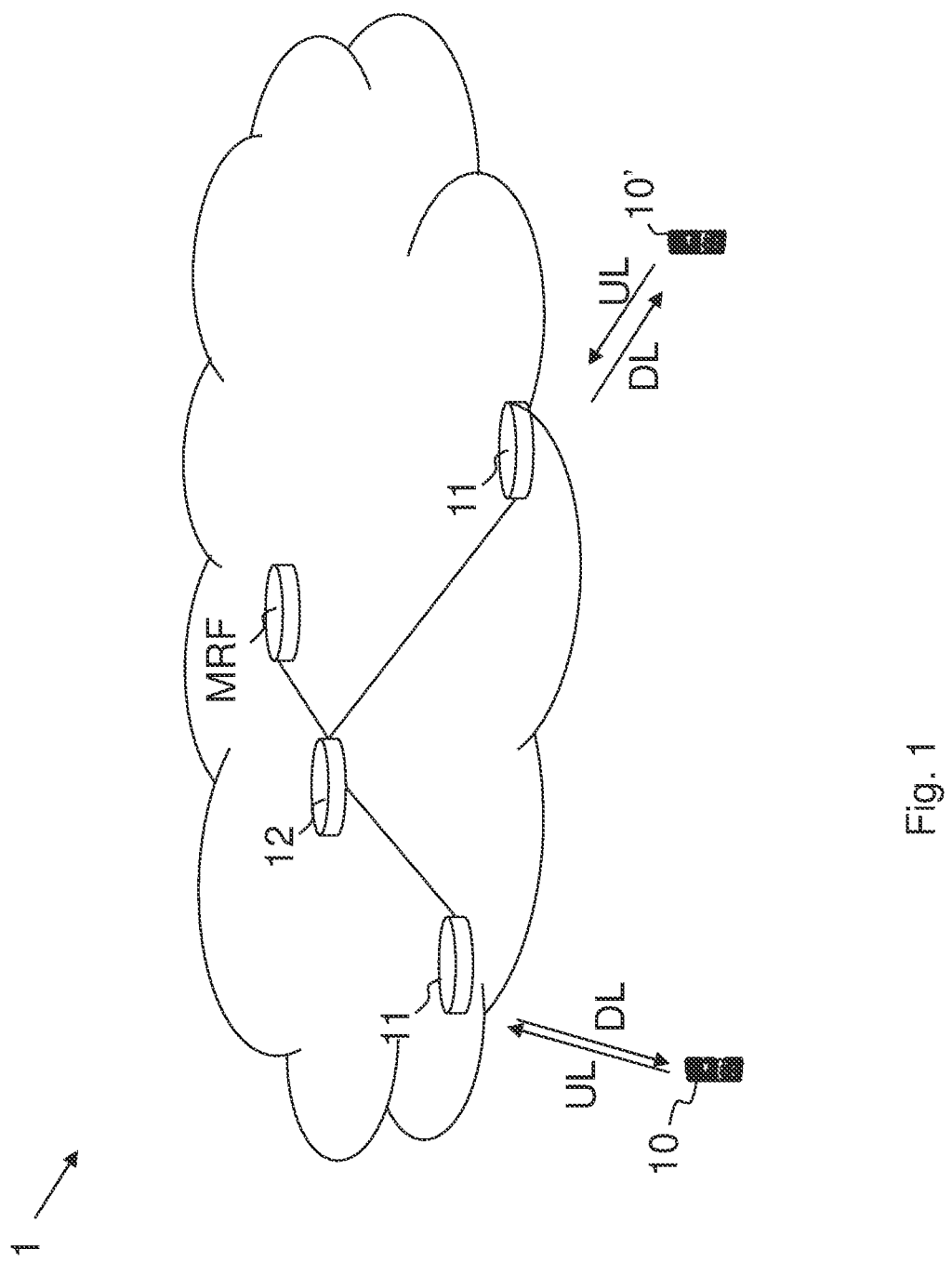
FIG. 1 shows a schematic overview depicting a communication network according to embodiments herein.

Embodiments herein relate to communication networks in general. FIG. 1 is a schematic overview depicting a communication network 1, such as a wireless communication network and/or a wired communication network. The communication network 1 may comprises one or more access networks and one or more CNs, and may use one or a number of different technologies such as WiFi, LTE, 5G or similar.

In the communication network 1, communication devices, e.g. a first UE 10 and a second UE 10' being e.g. a mobile station, a non-access point (non-AP) STA, a STA, a user equipment and/or a wireless terminal, communicate with e.g. a Media Resource Function (MRF) that provides media related functions such as media manipulation e.g. voice stream mixing and playing of tones and announcements over established communication sessions. The communication sessions use a session description protocol (SDP) for the communication sessions. It should be understood by the skilled in the art that "communication devices" is a non-limiting term which means any server, terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating with a network node.

The communication network 1 comprises a network node 12 being part of the communication session established between the first UE 10 and the MRF, and also of the communication session established between the second UE 10' and e.g. the MRF. The network node is configured to connect entities, such as the first UE 10 and the second UE 10', of the two established communication sessions with each other. The communication sessions may also be over a number of intermediate nodes 11 i.e. entities being part of the communication session forwarding messages towards destination.

According to embodiments herein the network node 12 triggers an SDP exchange by sending a request with an indication over one or more established connections. The indication indicates a request of one or more mappings of a payload type number to a codec associated to the communication session. The network node 12 receives a response, wherein the response comprises one or more response indications, each indicating one or more mappings of a payload type number, e.g. any number between 96-127, to a codec, e.g. Adaptive Multi-Rate Wideband (AMR-WB), AMR, Opus, telephone event etc., associated to the communication session e.g. used in the established communication session. The network node 12 selects a mapping of a payload type number to a codec based on the one or more response indications in the received response. Thus, the network node 12 based on knowledge of used payload type numbers mapped to different codecs selects a suggested payload type number for a codec e.g. not used in any of the established communication sessions if not already used for that particular codec, i.e. re-use of mapping is preferred when possible. The network node 12 may thus take codecs negotiated in the already established sessions into account when selecting a mapping. The network node 12 then sends, to the first and/or the second UE 10', a request indication, e.g. an invite indication, indicating the selected mapping suggested to use in an offer message generated by the first UE 10 or the second UE 10'. An established connection means a confirmed connection and/or acknowledged connection.

Embodiments herein enable that the mapping used when performing a SDP exchange is based on response indications of the established communication sessions and thereby may a collision be avoided of using a payload type number not allowed.

It should be noted that all nodes also referred to as user agents (UA) inside an IP Multimedia Subsystem (IMS) network and UAs outside the IMS network may be part of the interworking required to fulfil the complete solution. The UAs inside the IMS network may be implemented by different IMS nodes, the UAs outside the IMS network may be implemented by UEs such as Voice over LTE (VoLTE) devices.

Figure 2:
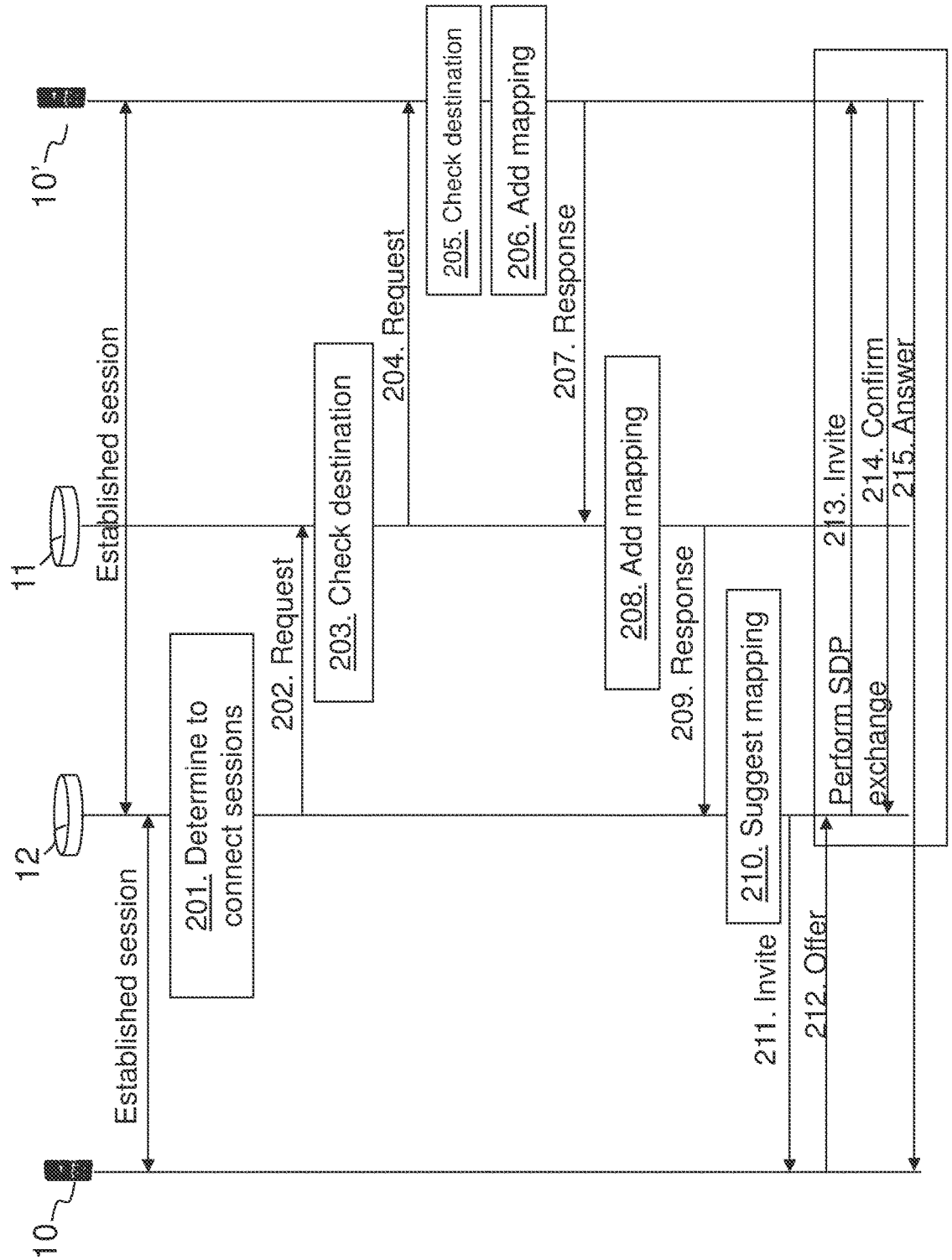
FIG. 2 shows a combined flowchart and signalling scheme according to embodiments herein.

FIG. 2 is an example of a combined flowchart and signalling scheme according to embodiments herein. The network node 12 is part of the communication sessions established between e.g. the MRF and the first UE 10 and the communication session established between e.g. the MRF and the second UE 10'.

Action 201. The network node 12 may determine to connect the communication sessions. E.g. the network node 12 may after an announcement is finished playing determine to connect the communication sessions, such as a caller is calling in to an interactive voice response (IVR) type of service, listens to an announcement and then chooses to be connected into an existing conference. This may also be controlled by a third party application for determining to connect two or more communication sessions.

Action 202. The network node 12 sends a request towards the second UE 10'. The request comprises the indication indicating a request of one or more mappings of a payload type number to a codec associated to the communication session. E.g. which mappings have been used, tried, is used and/or supported along the communication session.

Action 203. An entity such as the intermediate node intercepts the request and checks whether or not the intermediate node is the destination of the request. Action 204. If the intermediate node is not the destination of the request, the intermediate node forwards the request with the indication towards the destination.

Action 205. An end entity such as the second UE 10' may then check whether or not the request indicates that the second UE 10' is the destination of the request.

Action 206. The second UE 10', when being the destination of the request, adds in response to the received indication the response indication to a response, wherein the response indication indicates supported one or more mappings of a payload type number to a codec of the established session. Supported herein meaning used, tried, using, or similar.

Action 207. The entity such as the intermediate node 11 receives the response. The response has an indication, wherein the indication indicates a request of one or more mappings of a payload type number to a codec associated to the established session. The indication may be the same as in the request or the indication may be the response indication added by the second UE 10'. The indication may thus indicated that the entity shall add its known mappings, and/or add existing payload type number to codec mappings known by UE 10'. The indication may thus be that added mappings are present in the response or a flag indicating that mappings are to be added.

Action 208. The intermediate node 11 adds another response indication to the received response, wherein the other response indication indicates related, such as supported or used, one or more mappings of a payload type number to a codec of the established session.

Action 209. The intermediate node 11 further sends, towards the network node 12, the response with the response indication, i.e. existing payload type number mapping to a codec in the existing session.

Action 210. The network node 12 further selects a suggested mapping of a payload type number to a codec based on the one or more response indications in the received response. Thus, the network node 12 collects information about all mappings used along the way and therefore the network node 12 may compute a mapping compatible with all involved nodes. If no such mapping is possible the network node 12 may signal to a requesting entity, i.e. the entity or external system requesting the process of joining the sessions, that the joining of the communication sessions cannot be achieved without e.g. changing media streams and/or changing codecs.

Action 211. The network node 12 then sends to e.g. the first UE 10, the request indication indicating the selected mapping of a payload type number to a codec suggested to use in an offer message generated by the first UE 10.

Action 212. The entity such as the first UE 10 may thus receive the request indication, select a requested mapping of payload type number to codec taking the request indication into account; and further transmit to the network node 12 an offer message with the selected requested mapping of payload type number to codec.

Action 213. The network node 12 may then receive the offer message with the requested mapping of payload type number to codec, and may transmit an invite message to the second UE 10', wherein the invite message indicates the selected requested mapping of payload type number to codec in the offer message.

Action 214. The second UE 10' may then transmit back a confirmation about using the selected requested mapping of payload type number to codec in the offer message.

Action 215. The second UE 10' may then transmit to the first UE 10 an answer using the selected requested mapping in the answer.

Action 213, 214 and 215 are part of performing an SDP exchange with the requested mapping of payload type number to codec to use on both communication sessions.

The embodiments herein may be implemented in a SIP solution. Not all nodes involved may necessarily use SIP, some (e.g. UE) may using WebRTC, i.e. WebRTC clients. In SDP exchange for SIP sessions an offerless re-INVITE is sent on one of the dialogs in order to receive an SDP-offer that is sent in a re-INVITE on the other dialog. If the SDP-offer received in the response to the offerless INVITE uses real time protocol (RTP) and contains payload type numbers conflicting, mapped to another codec, with the already in use payload type numbers on the other SIP dialog the two dialogs cannot be connected without changing codec, e.g. media stream, on at least one of the dialogs. Since the available payload type space that can be used for dynamic mapping is relatively small, ranging between 96-127, the risk of both dialogs using the same number for a different codec is considerable. In addition, an end to end call can pass through several B2BUAs, each one increasing the chance of codec collision.

Before triggering the SDP exchange between the two dialogs to be connected, the network node 12, such as a B2BUA, gathers information about payload type mapping to codec in use on both sides of the network. This is achieved by sending a request, such as an OPTIONS request, with an indication of mapping in a header on both dialogs, e.g. Dynamic-payload-type-mapping header on the both dialogs. The UE sends a response, e.g. 200 response, to the request, which response contains the local knowledge of the payload type mapping to codec. Each network node along the way adds, if necessary, new local mappings to the response. This way, when the response reaches the B2BUA, it contains information about all mappings used along the way and therefore the network node 12 can compute a mapping compatible with all involved nodes. If no such mapping is possible the network node 12 may signal to a requesting entity (the entity or external system requesting the process of joining the sessions) that the joining cannot be achieved without changing media streams. E.g. the network node may know a mapping compatible with all the nodes, such as B2BUAs, that the response passed. Knowing all codecs needed for the call in the whole network, the B2BUA sends a mapping proposal in an invite such as an offerless invite e.g. a challenge re-INVITE that should be used in the SDP offer generated by an end entity.

Figure 3:
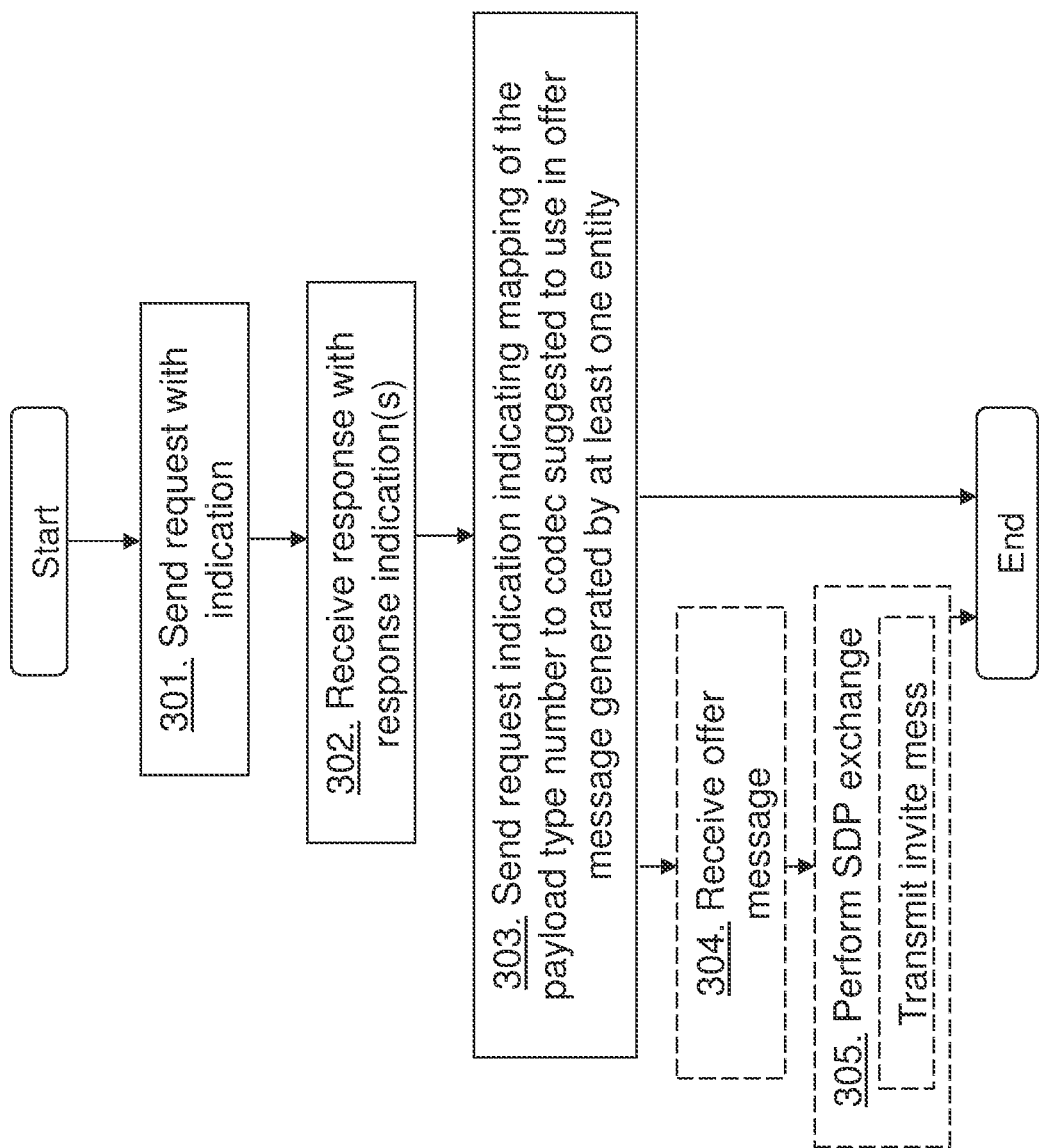
FIG. 3 shows a schematic flowchart depicting a method performed by a network node according to embodiments herein.

FIG. 3 is a block diagram depicting the method performed by the network node 12 for handling the communication session in the communication network using the SDP for communication sessions. The network node 12 is configured to connect entities of two established communication sessions, e.g. SIP dialogs, with each other. The network node 12 may thus trigger an SDP exchange.

Action 301. The network node 12 sends, on one or both established communication sessions, the request with the indication, wherein the indication indicates a request of one or more mappings of the payload type number to the codec associated to the communication session. Associated herein meaning e.g. mapping used, tried, is using; and/or supported by the communication session. The indication may be added in a header, e.g. Dynamic-payload-type-mapping header on e.g. both SIP dialogs, or a payload of the request.

Action 302. The network node 12 receives, over at least one established communication session, the response, wherein the response comprises one or more response indications, wherein a response indication indicates one or more mappings of a payload type number to a codec associated to the communication session.

Action 303. The network node 12 further sends, to at least one of the entities, the request indication indicating the mapping of the payload type number to the codec suggested to use in the offer message generated by the at least one entity, wherein the mapping is selected based on the one or more response indications in the received response. It should be noted that there may be more than one response, in the usual case e.g. one response for the first established connection and one response from the second established connection. Connections established by using the SIP protocol the request may be an options request, the request indication may be sent in an invite message, and the response may be a confirmation message. Alternatively, connections established using WEB RTC the request and the request indication may be sent over a real time communication data channel.

Action 304. The network node 12 may further receive an offer message with a requested mapping of payload type number to codec.

Action 305. The network node 12 may then perform an SDP exchange with the requested mapping of payload type number to codec to use on both communication sessions. E.g. the network node 12 may transmit an invite message to the other entity of the entities, wherein the invite message comprises a second indication, wherein the second indication indicates that the other entity must use the requested mapping.

Figure 4:
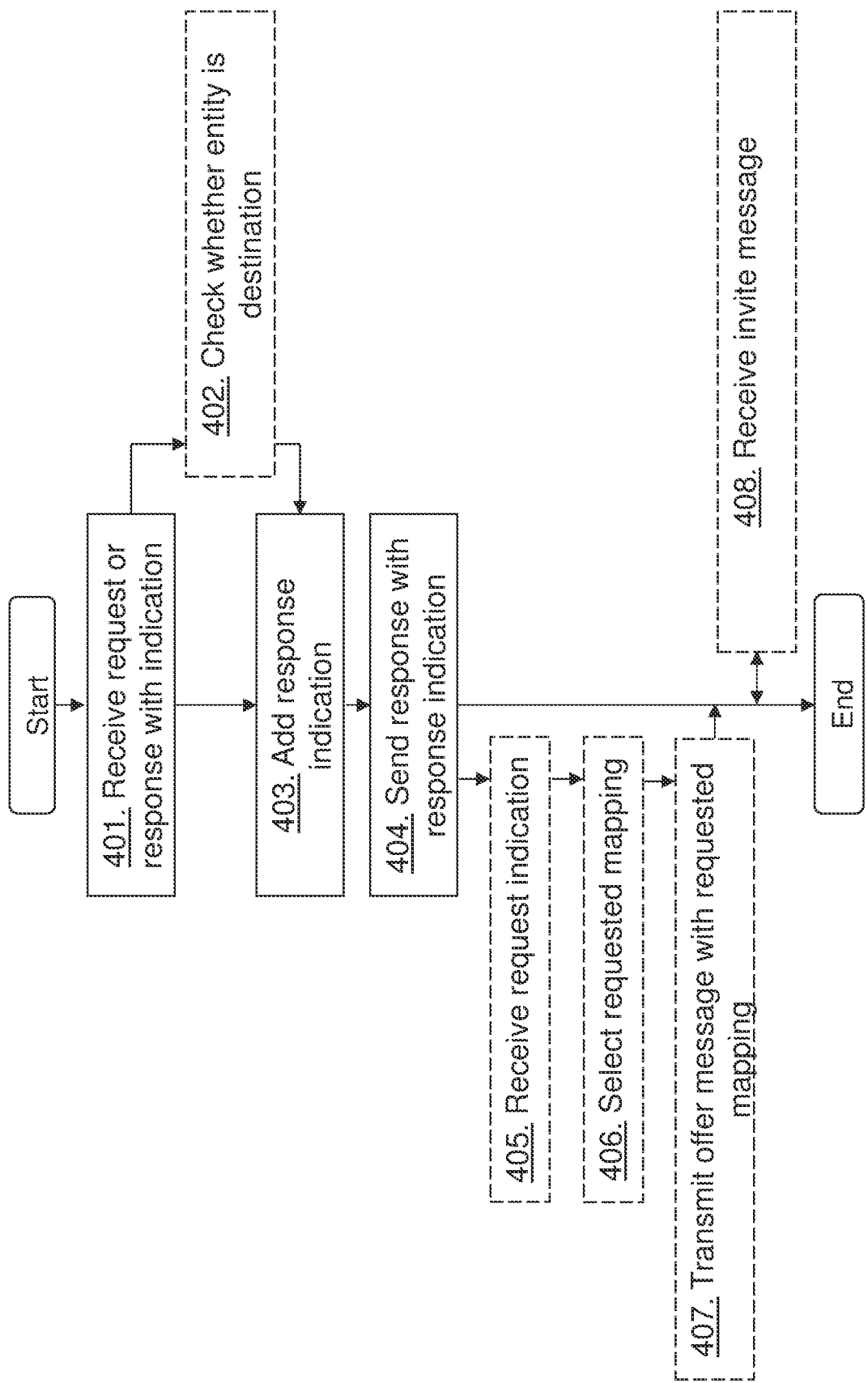
FIG. 4 shows a schematic flowchart depicting a method performed by an entity according to embodiments herein.

FIG. 4 is a block diagram depicting the method performed by the entity, such as the UE 10, second UE 10' or the intermediate node 11, of an established communication session for handling a communication session in the communication network 1 using the SDP for communication sessions. The entity is part in the established session with the network node 12.

Action 401. The entity receives the request, e.g. when the entity is an end UE, or the response, e.g. when the entity is an intermediate node, with the indication. The indication indicates a request of one or more mappings of a payload type number to a codec associated to the established session. The received request may be an options querying or request such as a SIP options request. The response may be a confirmation message such as a SIP confirmation message.

Alternatively, the request may be received over a real time communication data channel e.g. as in a webRTC.

Action 402. The entity may check the request whether the entity is a destination of the request.

Action 403. The entity adds the response indication to a response, e.g. when the entity is the end UE, or to the received response, e.g. when the entity is the intermediate node such as B2BUAs. The response indication indicates related one or more mappings, such as supported, existing mappings, tried mappings or used mappings, of a payload type number to a codec of the established session e.g. based on the knowledge of the entity which may or may not or partially overlap with already existing information in the response received. Related mappings herein meaning supported mappings such as existing payload type number mapping in the existing session, tried mappings and/or used mappings. The entity may add the response indication to the response when determined that the entity is the destination of the request, i.e. the entity may thus create the response and add the response indication to the response. The response indication may be added in the header or the payload of the response or to the received response in case of being an intermediate node.

Action 404. The entity further sends, towards the network node 12, the response with the response indication.

Action 405. The entity may receive from the network node 12, the request indication indicating the mapping of a payload type number to a codec suggested to use in an offer message generated by the entity. The request indication may be received in an invite message such as a SIP invite message, alternatively, the request indication may be received over a real time communication data channel e.g. in a WEB RTC.

Action 406. The entity may select a requested mapping of payload type number to codec taking the request indication into account.

Action 407. The entity may further transmit to the network node 12 an offer message with the requested mapping of payload type number to codec.

Action 408. In some embodiments, e.g. being the second UE 10', the entity receives an invite message from the network node 12. The invite message comprises a second indication, wherein the second indication indicates that the entity must use a requested mapping indicated in the invite message. Thus, the entity is ordered to use the requested mapping indicated in the invite message.

Figure 5A:
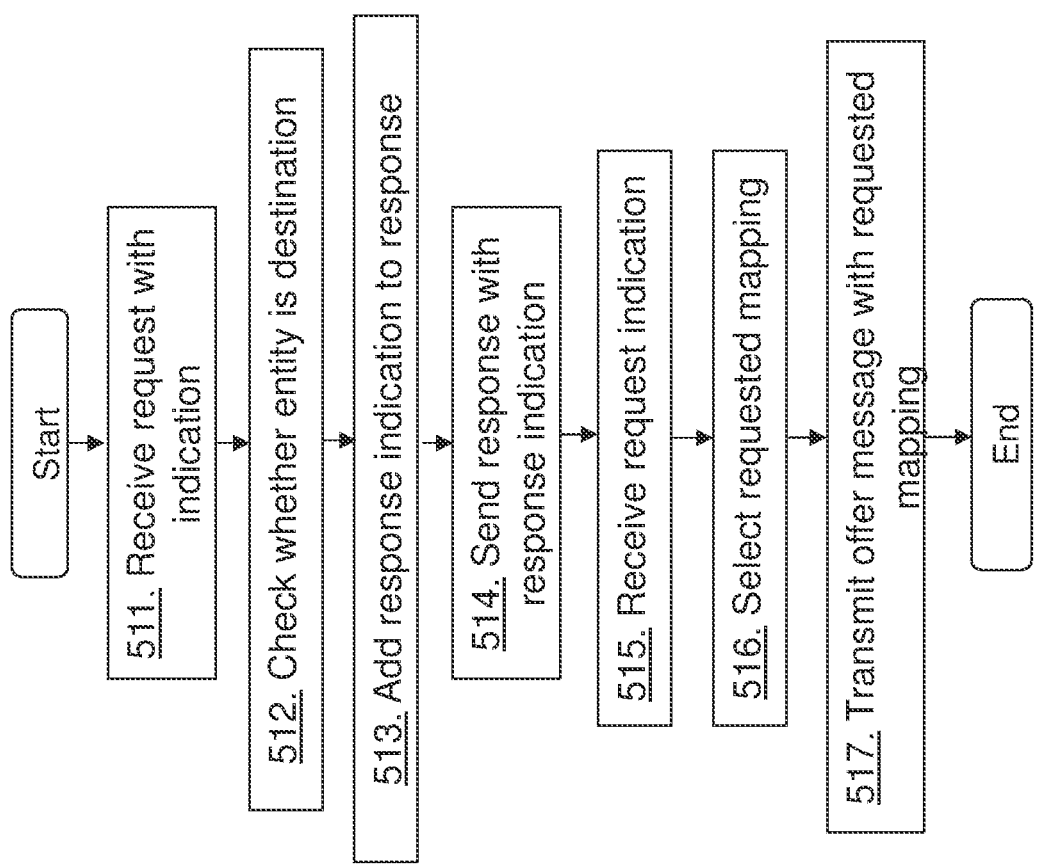
FIG. 5a shows a schematic flowchart depicting a method performed by an entity being an end entity according to embodiments herein.

FIG. 5a is a block diagram depicting the method performed by the entity being an end entity such as the first UE of an established communication session for handling a communication session in the communication network 1 using the SDP for communication sessions. The entity is thus part in the established session with the network node 12.

Action 511. The end entity receives the request with the indication. The indication indicates the request of one or more mappings of the payload type number to the codec associated to the established session. The request may be an options request for querying.

Action 512. The end entity may check the request whether the entity is a destination of the request. In this illustrated case the end entity is the destination.

Action 513. The end entity adds the response indication to the response. The response indication indicates used or tried one or more mappings of a payload type number to a codec of the established session. The end entity may thus create the response and add the response indication to the response.

Action 514. The end entity further sends, towards the network node 12, the response with the response indication.

Action 515. The end entity may further receive from the network node 12, the request indication indicating the mapping of a payload type number to a codec suggested to use in an offer message generated by the entity. The request indication may be a re-invite request and is for requesting an SDP offer with the suggested mapping.

Action 516. The end entity may select a requested mapping of payload type number to codec taking the request indication into account.

Action 517. The end entity may further transmit to the network node 12 an offer message with the requested mapping of payload type number to codec. It should be noted that the end entity may further receive an offer with requested mapping and an indication that it must use the same codec mapping as the offer.

Figure 5B:
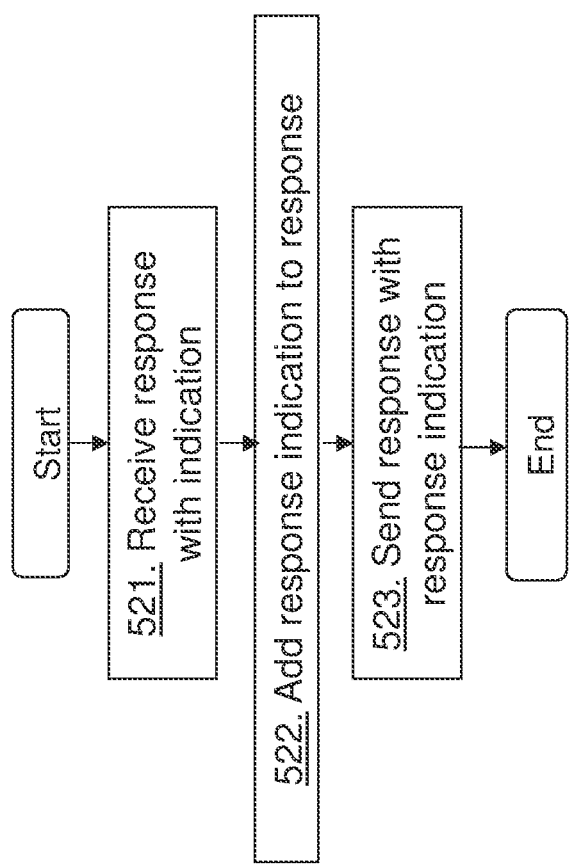
FIG. 5b shows a schematic flowchart depicting a method performed by an entity being an intermediate node according to embodiments herein.

FIG. 5b is a block diagram depicting the method performed by the entity, being an intermediate node 11, of an established communication session for handling a communication session in the communication network 1 using the SDP for communication sessions. The entity is thus part in the established session with the network node 12.

Action 521. The intermediate node 11 receives the response with the indication, the indication may thus be that added mappings are present in the response or a flag indicating that mappings are to be added. Thus, the indication in the received response indicates a request of one or more mappings of a payload type number to a codec associated to the established session.

Action 522. The intermediate node 11 adds the response indication to the received response. The response indication indicates related one or more mappings of a payload type number to a codec of the established session. The response indication may be added in the header or the payload of the received response.

Action 523. The intermediate node 11 further sends, forwards towards the network node 12, the response with the response indication.

Figure 6:
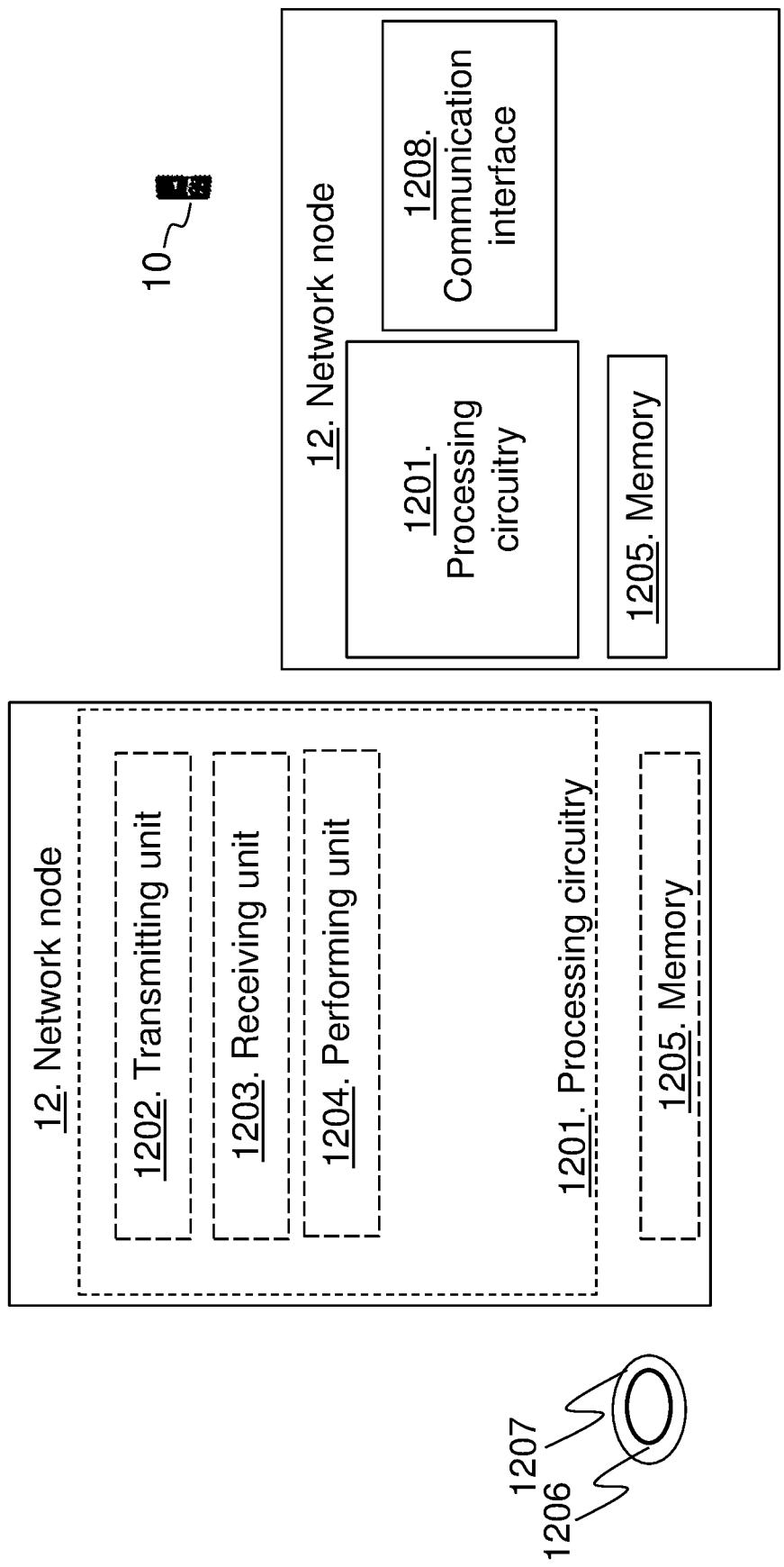
FIG. 6 is a block diagram depicting a network node according to embodiments herein.

FIG. 6 is a block diagram depicting, in two embodiments, the network node 12 such as the B2BUA node for handling a communication session in the communication network using a SDP for communication sessions according to embodiments herein. The network node 12 is configured to connect entities of two established communication sessions with each other.

The network node 12 may comprise processing circuitry 1201, e.g. one or more processors, configured to perform the methods herein.

The network node 12 may comprise a transmitting unit 1202, such as a transmitter and/or a transceiver. The network node 12, the processing circuitry 1201, and/or the transmitting unit 1202 is configured to send, on one or both established communication sessions, the request with the indication. The indication indicates the request of one or more mappings of a payload type number to a codec associated to the communication session. The indication may be added in a header or a payload of the request. It should be noted that the request may be an options request, The network node 12 may comprise a receiving unit 1203, such as a receiver and/or a transceiver. The network node 12, the processing circuitry 1201, and/or the receiving unit 1203 is configured to receive, over at least one established communication session, the response, wherein the response comprises one or more response indications. A response indication indicates one or more mappings of a payload type number to a codec associated to the communication session.

The network node 12, the processing circuitry 1201, and/or the transmitting unit 1202 is further configured to send, to at least one of the entities, the request indication indicating a mapping of a payload type number to a codec suggested to use in an offer message generated by the at least one entity, wherein the mapping is selected based on the one or more response indications in the received response. The request indication may be sent in an invite message, and the response may be a confirmation message e.g. of a SIP communication. The request and the request indication may be sent over a real time communication data channel e.g. in using webRTC.

The network node 12, the processing circuitry 1201, and/or the receiving unit 1203 may be configured to receive the offer message with a requested mapping of payload type number to codec. The network node 12 may further comprise a performing unit 1204. The network node 12, the processing circuitry 1201, and/or the performing unit 1204 may be configured to perform the SDP exchange with the requested mapping of payload type number to codec to use on both communication sessions. The network node 12, the processing circuitry 1201, and/or the transmitting unit 1202 may then further be configured to transmit the invite message to the other entity of the entities, wherein the invite message comprises a second indication, wherein the second indication indicates that the other entity must use the requested mapping.

The network node 12 further comprises a memory 1205. The memory comprises one or more units to be used to store data on, such as request indication, response indications, indications, mappings, codecs, payload type number, applications to perform the methods disclosed herein when being executed, and similar. The network node 12 may comprise a communication interface 1208 such as a transmitter, a receiver, a transceiver and/or one or more antennas.

The methods according to the embodiments described herein for the network node 12 are respectively implemented by means of e.g. a computer program product 1206 or a computer program, comprising instructions, i.e., software code portions, which, when executed on at least one processor, cause the at least one processor to carry out the actions described herein, as performed by the network node 12. The computer program product 1206 may be stored on a computer-readable storage medium 1207, e.g. a disc, a universal serial bus (USB) stick, memory or similar. The computer-readable storage medium 1207, having stored thereon the computer program product, may comprise the instructions which, when executed on at least one processor, cause the at least one processor to carry out the actions described herein, as performed by the network node 12. In some embodiments, the computer-readable storage medium may be a non-transitory computer-readable storage medium or a transitory computer-readable storage medium. Thus, the network node may comprise the processing circuitry and the memory, said memory comprising instructions executable by said processing circuitry whereby said network node is operative to perform the methods herein.

Figure 7:
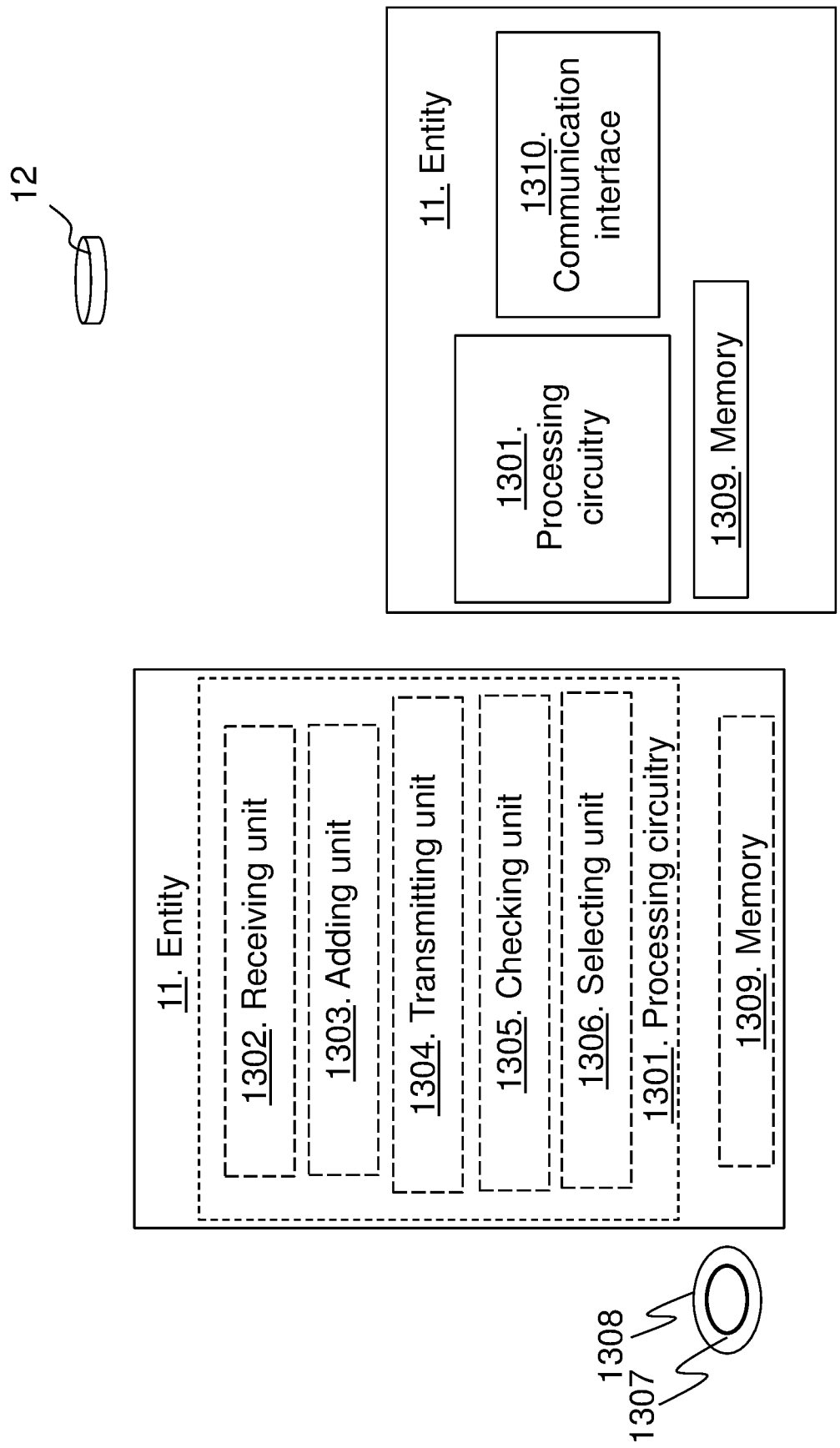
FIG. 7 is a block diagram depicting an entity, such as an end entity, according to embodiments herein.

FIG. 7 is a block diagram depicting, in two embodiments, the entity, such as an end entity or a B2BUA node, of an established communication session for handling a communication session in a communication network using the SDP for communication sessions according to embodiments herein. The entity is configured to be part in the established session with the network node 12.

The entity may comprise processing circuitry 1301, e.g. one or more processors, configured to perform the methods herein.

The entity may comprise a receiving unit 1302, such as a receiver and/or a transceiver. The entity, the processing circuitry 1301, and/or the receiving unit 1302 is configured to receive the request or the response with an indication, wherein the indication indicates a request of one or more mappings of a payload type number to a codec associated to the established session.

The entity may comprise an adding unit 1303. The entity, the processing circuitry 1301, and/or the adding unit 1303 is configured to add a response indication to a response or the received response, wherein the response indication indicates related one or more mappings of a payload type number to a codec of the established session. The response indication may be added in a header or a payload of the response or the received response.

The entity may comprise a transmitting unit 1304, such as a transmitter and/or a transceiver. The entity, the processing circuitry 1301, and/or the transmitting unit 1304 is configured to send, towards the network node 12, the response with the response indication.

The entity may comprise a checking unit 1305. The entity, the processing circuitry 1301, and/or the checking unit 1305 may be configured to check the request whether the entity is a destination of the request and in that case add the response indication to the response.

The entity, the processing circuitry 1301, and/or the receiving unit 1302 may be configured to receive from the network node, a request indication indicating a mapping of a payload type number to a codec suggested to use in an offer message generated by the entity.

The entity may comprise a selecting unit 1306. The entity such as the end entity, the processing circuitry 1301, and/or the selecting unit 1305 may be configured to select a requested mapping of payload type number to codec taking the request indication into account. The entity, the processing circuitry 1301, and/or the transmitting unit 1304 may then be configured to transmit to the network node an offer message with the requested mapping of payload type number to codec.

It should be noted that the received request may be an options request, the request indication may be received in an invite message, and the response may be a confirmation message e.g. as in SIP communication. E.g. in webRTC sessions the request and the request indication may be received over a real time communication data channel.

The entity, the processing circuitry 1301, and/or the receiving unit 1302 may be configured to receive an invite message from the network node 12, wherein the invite message comprises the second indication, wherein the second indication indicates that the entity must use a requested mapping indicated in the invite message. Thus, the entity uses the requested mapping.

The entity further comprises a memory 1309. The memory comprises one or more units to be used to store data on, such as request indication, response indications, indications, mappings, codecs, payload type number, applications to perform the methods disclosed herein when being executed, and similar. The entity may comprise a communication interface 1310 such as a transmitter, a receiver, a transceiver and/or one or more antennas.

The methods according to the embodiments described herein for the entity are respectively implemented by means of e.g. a computer program product 1307 or a computer program, comprising instructions, i.e., software code portions, which, when executed on at least one processor, cause the at least one processor to carry out the actions described herein, as performed by the entity. The computer program product 1307 may be stored on a computer-readable storage medium 1308, e.g. a disc, a universal serial bus (USB) stick, memory or similar. The computer-readable storage medium 1308, having stored thereon the computer program product, may comprise the instructions which, when executed on at least one processor, cause the at least one processor to carry out the actions described herein, as performed by the entity. In some embodiments, the computer-readable storage medium may be a non-transitory computer-readable storage medium or a transitory computer-readable storage medium. Thus, the entity may comprise the processing circuitry and the memory, said memory comprising instructions executable by said processing circuitry whereby said entity is operative to perform the methods herein.

In some embodiments a more general term "network node" is used and it can correspond to any type of radio network node or any network node, which communicates with a wireless device and/or with another network node. Examples of network nodes are B2BUAs, NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another wireless device in a cellular or mobile communication system. Examples of wireless devices are target device, device-to-device (D2D) UE, proximity capable wireless device (aka ProSe UE), machine type wireless device or wireless device capable of machine to machine (M2M) communication, PDA, PAD, Tablet, mobile terminals, smart phone, laptop embedded equipment (LEE), laptop mounted equipment (LME), USB dongles etc.

The embodiments are described for 5G. However the embodiments are applicable to any RAT or multi-RAT systems, where the wireless device receives and/or transmit signals (e.g. data) e.g. LTE, LTE FDD/TDD, WCDMA/HSPA, GSM/GERAN, Wi Fi, WLAN, CDMA2000 etc.

Antenna node is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by at least one network node for handling a communication session in a communication network using a session description protocol, SDP, for communication sessions, wherein the at least one network node is configured to connect entities of two established communication sessions with each other, the method comprising:
  sending, on the two established communication sessions, from one of the entities towards the other one of the entities, a request with a request indication, wherein the request indication indicates a request of one or more mappings of a payload type number to a codec associated to the communication session;
  intercepting the request and checking whether or not the other one of the entities is a final destination of the request;
  in response to the other one of the entities being not the final destination of the intercepted request, forwarding the intercepted request to another one of the entities that is final destination of the request;
  in response to the other one of the entities being the final destination of the intercepted request, adding a response indication to a response, wherein the response indication indicates one or more supported mappings of a payload type number to a codec associated to the communication session;
  sending, on the two established communication sessions, from the other one of the entities towards the one of the entities, the response;
  suggesting a mapping of a payload type number to a codec associated to the communication session based on knowledge of used payload type numbers mapped to a different codecs according to the received response;
  sending, on one of the two established communication sessions, to the one of the entities, an invite with an invite indication, wherein the invite indication indicates the suggested mapping of a payload type number to a codec associated to the communication session;
  selected the suggested mapping of a payload type number to a codec associated to the communication session by taking the invite indication into account;
  generating an offer message with the selected mapping of a payload type number to a codec associated to the communication session by the one of the entities;

sending, on the two established communication sessions, from the one of the entities towards the other one of the entities, the offer message; and performing an SDP exchange according to the received offer message.

2. The method according to claim 1, wherein the request, the response, the invite and the offer message are sent over a real time communication data channel.

3. The method according to claim 1, wherein the request indication is added in a header or a payload of the request, the response indication is added in a header or a payload of the response, and the invite indication is added in a header or a payload of the invite.

4. The method according to claim 1, wherein performing the SDP exchange according to the received offer message comprises: generating an invite message with the selected mapping of a payload type number to a codec associated to the communication session in response to the receiving the offer message; sending, on the other one of the two established communication sessions, to the other one of the entities, the invite message; and making a confirmation or an answer response to the invite message.

5. A method performed by entities of two established communication sessions for handling a communication session in a communication network using a session description protocol, SDP, for communication sessions, where at least one network node is configured to connect the entities of the two established communication sessions with each other, the method comprising:

sending, on the two established communication sessions, from one of the entities towards the other one of the entities, a request with a request indication, wherein the request indication indicates a request of one or more mappings of a payload type number to a codec associated to the established communication session;

intercepting the request and checking whether or not the other one of the entities is a final destination of the request;

in response to the other one of the entities being not the final destination of the intercepted request, forwarding the intercepted request to another one of the entities that is the final destination of the request;

in response to the other one of the entities being the final destination of the intercepted request, adding a response indication to a response, wherein the response indicates one or more supported mappings of a payload type number to a coded of the communication established session;

sending, on the two established communication sessions, from the other one of the entities towards the one of the entities, the response;

suggesting a mapping of a payload type number to a codec associated to the communication session based on knowledge of used payload type numbers mapped to a different codecs according to the received response;

sending, on one of the two established communication sessions, to the one of the entities, an invite with an invite indication, wherein the invite indication indicates the suggested mapping of a payload type number to a codec associated to the communication session;

selected the suggested mapping of a payload type number to a codec associated to the communication session by taking the invite indication into account;

generating an offer message with the selected mapping of a payload type number to a codec associated to the communication session by the one of the entities;

sending, on the two established communication sessions, from the one of the entities towards the other one of the entities, the offer message; and performing an SDP exchange according to the received offer message.

6. The method according to claim 5, wherein performing the SDP exchange according to the received offer message comprises: generating an invite message with the selected mapping of a payload type number to a codec associated to the communication session in response to the receiving the invite message; sending, on the other one of the two established communication sessions, to the other one of the entities, the invite message; and making a confirmation or an answer responsive to the invite message.

7. The method according to the claim 5, wherein the request indication is added in a header or a payload of the request, the response indication is added in a header or a payload of the response, and the invite indication is added in a header or a payload of the invite.

* * * * *